March 12, 1940.   E. W. SMITH   2,193,782
NEGATIVE PLATE WITH PURE LEAD-COATED GRID
Filed Dec. 7, 1937
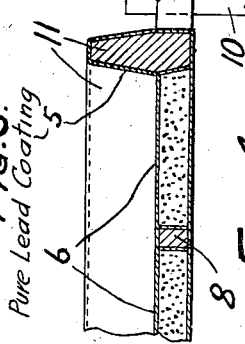
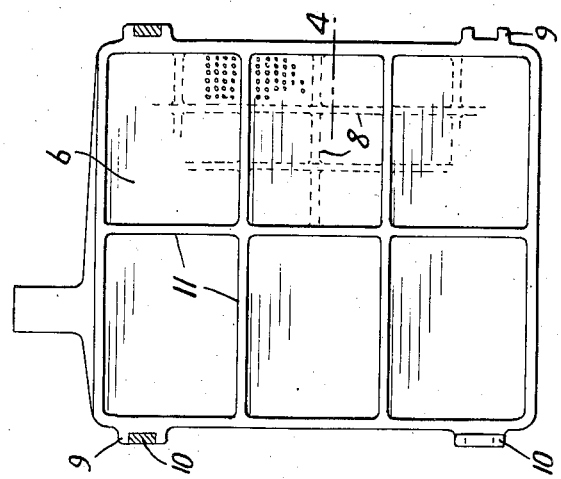
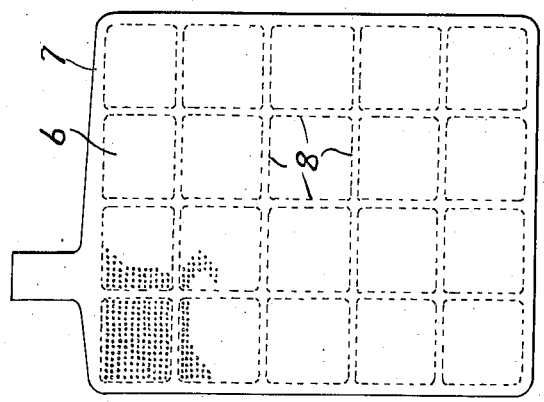
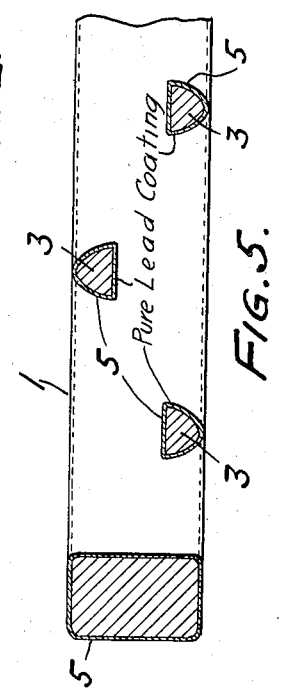
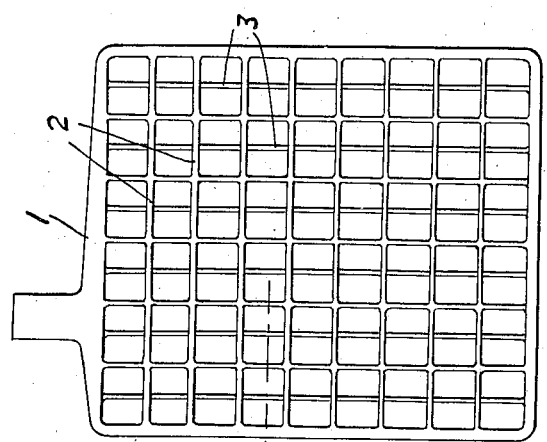
WITNESS:
Rob R. Kitchel.
INVENTOR
Edward W. Smith
BY
Augustus B. Stoughton
ATTORNEY.

Patented Mar. 12, 1940

2,193,782

UNITED STATES PATENT OFFICE 2,193,782

NEGATIVE PLATE WITH PURE LEAD-COATED GRID

Edward Wanton Smith, Philadelphia, Pa., assignor to The Electric Storage Battery Company, Philadelphia, Pa., a corporation of New Jersey Application December 7, 1937, Serial No. 178,487

3 Claims. (Cl. 136—64)

In batteries of the lead-sulphuric acid type, it has been common practice to use grids for both positive and negative plates consisting of lead alloyed with antimony and small amounts of other metals, such alloy being characterized by greater stiffness than pure lead, thus minimizing tendency toward growth and buckling.

It has long been recognized, however, that one serious disadvantage results from the use of this alloy, namely, that, with the slow oxidation of the positive grid metal, the antimony is gradually liberated in the electrolyte, and part of this liberated antimony finds its way to the negative plates and is there deposited. Owing to its electro-chemical characteristics, this antimony, under certain operating circumstances, may set up the condition of a local couple with the result that local action occurs at the negative plates, which thus become subject to self-discharge, sometimes in a very gradual but cumulative manner, eventually resulting in serious impairment of the functioning of the negative plates.

It has been supposed that this local action was principally due to antimony deposited in the sponge lead which constitutes the active material of the negative plate. I have discovered by recent research that, although antimony may be deposited pretty generally on all parts of the negative plates after protracted usage, it is deposited in greater quantity or in more active condition upon the exposed surfaces of the alloy grids than upon the active material, or on other exposed surfaces of pure lead, as in the box design. This is demonstrated by the fact that hydrogen gas, liberated as a result of self-discharge of the negative plate, is always given off in far larger volume from the exposed alloy bars and frames of the grid. This holds for all kinds of negative plates having exposed surfaces of antimony alloy, for new plates where local action is relatively little and to even greater extent with old plates that are badly contaminated with antimony. The local action, as evidenced by the gassing, increases with age, and consequent deposit of antimony, and as I have discovered is intimately connected with the exposed surfaces of the grid bars and frames. The hydrogen is liberated freely from the grid bars, while the exposed surfaces of active material and of perforated pure lead in the box design remain by comparison almost free from gassing even during extensive service.

The exposed alloy surfaces, in combination with the antimony deposited upon them, thus constitute one pole of the local couple which causes self-discharge, the sponge lead constituting the other pole.

The object of the present invention is to so construct a negative plate that all parts of it exposed to the electrolyte shall be of the same potential as referred to the acid, so that local action conditions shall be absent initially; and, moveover, so that there shall be minimum tendency for intensified deposit of antimony at certain spots, with consequent progressive tendency toward local action.

To this end, I employ a composite grid, basically of lead, but in the main alloyed with antimony to give necessary stiffness, while the surfaces all consist of pure lead. The pure lead upon the surfaces may be extremely thin, since chemical action on the negative grids is almost nothing, but the covering must be as complete as possible, so as not to expose any portions of the alloy, which would be favorable for the intense deposit of antimony. The composite grid may be produced by first casting or otherwise constructing a grid plate of suitable design, and then subjecting it to an electro-chemical process, whereby a thin adherent coating of lead is deposited upon it. Other methods of applying the coating, as for example spraying, may be employed.

For a further exposition of my invention, reference may be had to the annexed drawing and specification at the end whereof the novel features of my invention will be specifically pointed out and claimed.

In the drawing:

Fig. 1 is a side elevation of a grid having staggered, horizontal and vertical bars.

Fig. 2 is a side elevation of a negative plate of the box type.

Fig. 3 is a side elevation of a specialized box type intended for outside plates only.

Fig. 4 is a cross-section on line 4 of Fig. 3 on an enlarged scale.

Fig. 5 is a cross-section on line 5 of Fig. 1 on an enlarged scale.

In that embodiment of my invention chosen from among others for illustration in the drawing and description, my device is shown as consisting of a negative plate having a grid I formed of a number of horizontal cross-bars 2 and a number of vertical cross-bars 3. The cross-bars 2 and 3 form between them a plurality of interstices which are filled with a paste of sponge lead which form the active material of the plate. The grid thus forms a mechanical support for the active material and a conductor for the current from the surfaces of the active material which contact with the electrolyte. The grid is customarily formed of lead-antimony alloy. As is best seen in Fig. 5, the grid has a layer 5 of pure lead which prevents local action thereon. The grid may be made by first casting an alloy grid of suitable composition and then applying an adherent covering of pure lead by electro-deposition or other appropriate process. The electro-plating process is suitable. By "pure lead" is meant not necessarily chemically pure lead but pure in the sense that it conforms to the ordinary specifications of pure lead.

Fig. 2 shows a negative plate of the standard box design made in two parts each consisting of a perforated sheet of pure lead 6 to which is cast an alloy frame 7 having cross-bars 8. The two parts form between them interior pockets between the perforated sheets 6, which pockets contain as active material sponge lead produced from powdered lead or lead oxide.

Fig. 3 shows a negative plate of specialized box type intended for outside plates only. It has projecting lugs 9 which co-operate with tie bars 10 for the purpose of holding the two outside plates tied rigidly together. The end plate also has certain cross-members 11 reinforced in thickness so as to give rigidity.

In my improved invention, all the parts of the plate which are made of alloy have their surfaces coated with a layer 5 of lead. This is best seen in Figs. 4 and 5.

I do not intend to be limited save as the scope of the attached claims and of the prior art may require.

I claim:

1. As a means for inhibiting local action, a negative plate for a storage battery having a composite grid with its entire external surface of pure lead and interior of lead antimony alloy.

2. As a means for inhibiting local action, a negative plate for a storage battery having a composite grid, the body of which consists of lead antimony alloy, and which is covered by a surface of pure lead electro-chemically deposited.

3. In a storage battery cell containing an electrolyte the combination of a positive plate containing antimony and subject to the release of antimony into the electrolyte, a negative plate having a grid containing antimony and upon which antimony from the electrolyte tends to deposit in a form calculated to promote local action and self-discharge, and means for restricting such deposition which comprises a pure lead coating applied to the surface of the grid of the negative plate.

EDWARD WANTON SMITH.